April 14, 1970  W. M. CRAWFORD  3,505,869
APPARATUS FOR MEASURING FLUID LEVEL IN A CONTAINER
Filed April 17, 1968

INVENTOR
WINFORD M. CRAWFORD

BY
ATTORNEYS

_United States Patent Office_

3,505,869
Patented Apr. 14, 1970

1

3,505,869
APPARATUS FOR MEASURING FLUID LEVEL IN A CONTAINER
Winford M. Crawford, Anaheim, Calif., assignor to the United States of America as represented by the Secretary of the Air Force
Filed Apr. 17, 1968, Ser. No. 721,978
Int. Cl. G01f 23/12
U.S. Cl. 73—313      2 Claims

ABSTRACT OF THE DISCLOSURE

Apparatus having a magnet movable according to changes in level of material content inside a container of non-magnetic material for passage of magnet flux that encompasses various magnetic reed switches located at differing levels externally of the container. The magnetic flux is utilized in circuitry having a battery, ammeter and plural impedances electrically connected in series with each other and having particular magnetically-operated reed switches connected to effect electrical shunt of one or more impedances, so that current flow indicated externally by the ammeter varies to represent internal level of container content.

BACKGROUND OF THE INVENTION

Field of the invention

Figures 1, 2:
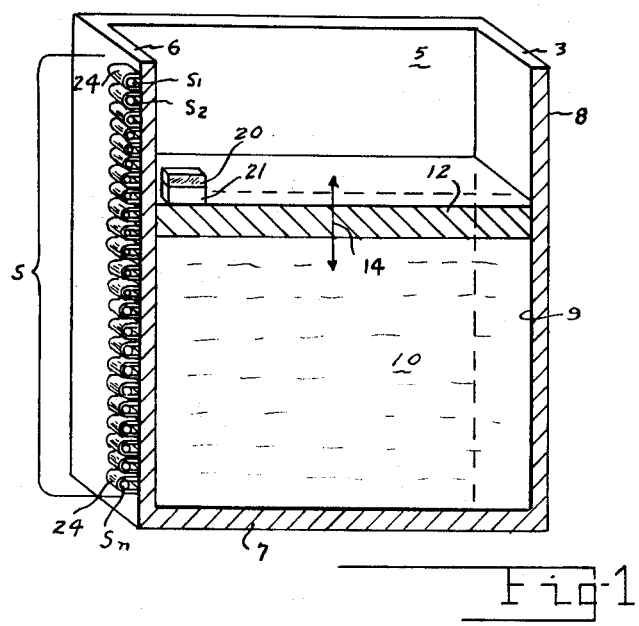

This invention relates to measurement of variable fluid level in a container, and more particularly, to apparatus that provides fluid level indication externally representative of internal fluid level measurement accomplished free of any electrical wiring and/or mechanical connections through the container.

Description of the prior art

Numerous prior patents show fluid level measuring devices having electrical or mechanical connections that extend between internal and external locations of a container. U.S. Patent 3,348,413—Zimmerle issued Oct. 24, 1967, shows a level measuring device of a type previously known.

Problems are encountered in container seals, mechanical or electrical contact wear and impairment of measuring operation of previous fluid level measuring apparatus. Such problems affect reliability and accuracy sought for content measurement and indication. Due to such problems, a sealed and/or pressurized container is susceptible to leakage of fluid contents. Such leakage is costly and is attributable at times to fluid level measuring means that require mechanical linkage, electrical wiring and other interconnection between inside and outside container locations. In addition to leakage, mechanical load and wear occurs in the linkage areas. Also, inside-outside mechanical linkages, electrical wiring and frictional contact engagement against resistive impedance can hinder measuring movement. Container contents often cause contact fouling due to contaminants, danger of explosion due to sparking in combustible surroundings, and other related malfunctions. Assurance of reliability and accuracy for container-content indications is difficult to attain.

SUMMARY OF THE INVENTION

A fluid material in variable quantity is engaged by a piston member movable in a container of non-magnetic material. A permanent magnet has non-magnetic support on the movable member and is positioned in increments commensurate with internal fluid level change. Change of magnet position provides variation in level at which magnetic flux passes laterally through the container to plural external magnetic reed switches connected in circuitry also located externally of the container. The circuitry includes a battery, ammeter and plural resistive impedances electrically in series connection with each other. The magnetically operable switches effect electrical shunt of one or more impedances in the circuitry and thereby control ammeter current indication that represents level of material content in the container. Magnetic shielding of suitable material is provided adjacent to each of the switches. External magnetic shielding limits influence of the magnet internally of the container to an area laterally outwardly of or directly opposite to each of the switches, subject to sufficient overlap to avoid any faulty or erroneous indications during movement between adjacent switches.

An object of the invention is to provide fluid level measuring apparatus having a permanent magnet that is movable into positions of differing levels inside a container and that provides magnetic flux used for external magnetic switch operation to control external indication that represents level of container content. Positive, incremental measurements of internal fluid level are achieved free of any electrical wiring and/or mechanical connections through the container. Due to lack of any such connections, the magnet carried by the member in the container is unimpeded for movement and unimpaired in accuracy of measurements. Leakage problems are obviated. Extreme longevity and reliability result from inherent long life expectancy of the components and lack of mechanical wear.

DESCRIPTION OF DETAILED EMBODIMENT OF INVENTION

Referring to FIGURE 1, a container 3 is shown having wall portions 5, 6, 7 and 8 of non-magnetic material forming interior storage space 9. The container 3 is occupied at least partially by a fluid material 10 in content variable to differing levels. The material 10 is supplied and removed in any well known manner, for example, through a suitable passage or valve-controlled conduit means (not shown). A piston member 12 is complementary to wall portions inside the container and is movable up or down in response to change of fluid level as indicated by arrow 14.

A permanent magnet 20, supported on a non-magnetic block 21, is carried by the movable piston member 12 internally of container 3. The magnet is made in a bar or U-shape of suitable material such as an alloy of aluminum, nickel and cobalt steel, commercially known as Alnico, disclosed by U.S. Patents 1,947,274; 1,968,569 and 2,027,994–9. The magnet 20 provides a field of magnetic flux represented by lines 22 passing through container wall portion 6 as indicated in the view of FIGURE 2. The container and block 21 are made of non-magnetic material which avoids any possible magnetic flux distortion. A plurality of magnetic reed switch cartridges is collectively designated by a reference S in FIGURE 1, including specific switches $S_1$, $S_2$, etc., through $S_n$ that are individually operated by the magnet 20. These switches are mounted externally along the container wall portion 6. Suitable means for mounting or fastening bond, such as epoxy material, secure the block 21, magnet 20 and switches in described locations.

FIGURE 2 schematically shows electrical circuitry and a fragmentary enlarged perspective view of switches $S_1$, $S_2$, etc., and $S_n$. The switches include resiliently deflectable arm portions $A_1$–$A_1'$, $A_2$–$A_2'$, etc., and $A_n$–$A_n'$, having contact ends $E_1$–$E_1'$, $E_2$–$E_2'$, etc., and $E_n$–$E_n'$. The arm portions and contact ends are encompassed by the magnetic flux in a field represented by lines 22. The flux path from magnet 20 extends laterally through wall portion 6 of the container of nonmagnetic material and around particular magnetic reed switches at differing levels of external location. Under magnetic urging, the arm portions deflect and engagement of contact ends occurs to establish a path of least reluctance for the magnetic flux from magnet 20. The magnetic reed switches are enclosed in sealed tubular glass envelopes shown in phantom in FIGURE 2 and commercially available from C. P. Clare Company or other sources.

A magnetic shield means 24 of substantially U-shaped cross section is provided for each magnetic switch. Each shield means 24 is mounted externally of wall portion 6 by use of suitable adhesive. The magnetic shields 24 limit the influence of the magnet 20 to an area directly opposite or adjacent to each of the reed switches. However, sufficient overlap of magnetic field of flux influence exists between adjacent switches so that possible instantaneous "open" or erroneous indication due to premature separation of switch contact ends is avoided. The magnetic shields 24 are made of Mu-Metal, Co-Netic or other suitable material. Although the shields 24 are not absolutely essential to magnetic operating principle, the accuracy of measurement is increased greatly by the addition of magnetic shields at each reed switch location. Stray magnetic fields are shielded out. With careful balance and precise mounting of magnet and switch components, accurate switch operation occurs whenever magnet 20 moves into an internal fluid-level-determined position adjoining an external reed switch. As the magnet 20 mounted on the movable piston member 12 passes into lateral alignment with a particular reed switch $S_n$, for example, the contact ends $E_n$–$E_n'$ engage under urging of magnetic field of flux. As the magnet 20 is moved beyond lateral alignment with a particular reed switch, the magnetic influence on the resilient arms ceases and contact ends open or separate to reset automatically for subsequent operation.

Circuitry in FIGURE 2 includes a battery 26, ammeter 28, protective resistance R for the ammeter, and resistive impedances, $R_1$, $R_2$, etc., and $R_n$ electrically in series connection with each other. Suitably insulated wires interconnect the reed switches from connections at $C_1$, $C_2$, etc., and $C_n$ to junctures $J_1$, $J_2$, etc., and $J_n$, respectively, in the circuitry as shown. Magnetic reed switch operation shunts or shorts out series circuit relationship of one or more of the resistive impedances $R_1$, $R_2$, etc. and $R_n$ whenever fluid level change occurs to cause up or down movement of the magnet 20 carried by the member 12. The current flow indicated by ammeter 28 varies due to change of series resistive impedance in the circuitry. Such change of resistive impedance is controlled by an external magnetic switch operation dependent upon internal fluid level upon which there is floating engagement of piston member 12 that carries magnet 20 in a perpendicular path of to and fro movement.

Optionally, a row of magnetic reed switches is mounted on an insulating strip (not shown). Suitable adhesive is used for securing the strip and switches in position externally along the container. In any event, the magnetic switches are located closely adjacent and parallel to each other externally of the container. Path of movement of the magnet 20 located internally of the container corresponds to that of mounting positions of the external switches collectively. It is to be understood that vertical, horizontal or other directions of path of magnet movement are possible if container pressurization is provided.

I claim:
1. Apparatus for internally measuring and externally indicating variable contents of a container, comprising, a member movable into variable positions inside the container and in engagement with the variable contents, a permanent magnet carried by said movable member internally of said container, and a plurality of magnetic reed switches having resilient arm portions that are urged into mutual engagement under flux influence of said permanent magnet, said reed switches mounted externally on said container and connected to an indicating means, magnetic shield means provided for each magnetic reed switch, each magnetic shield means surrounding a magnetic reed switch means and mounted on an externally wall of said container to limit the influence of said magnet individually upon said magnetic reed switches as said permanent magnet moves past said reed switches during internal measuring by said movable member for externally indicating the variable contents.

2. The apparatus of claim 1 wherein said each said shield means has a substantially U-shaped cross section, said magnetic reed switches being accessible externally to flux influence from said magnet located internally of said container.

References Cited
UNITED STATES PATENTS

| | | | |
|---|---|---|---|
| 2,339,922 | 1/1944 | Gatewood | 73—313 |
| 2,920,484 | 1/1960 | Reichert | 73—319 |
| 3,114,478 | 12/1963 | Hilkemeier et al. | |
| 3,200,645 | 8/1965 | Levins | 73—313 |
| 3,201,540 | 8/1965 | McNamara | 335—202 X |
| 3,445,796 | 5/1969 | Spiroch et al. | 335—205 |

FOREIGN PATENTS 1,057,919  5/1959  Germany.

S. CLEMENT SWISHER, Primary Examiner

D. M. YASICH, Assistant Examiner

U.S. Cl. X.R.

335—206